R. W. PITTMAN.
ATTACHMENT FOR LINOTYPE MACHINES.
APPLICATION FILED JUNE 7, 1910.
992,385. Patented May 16, 1911.
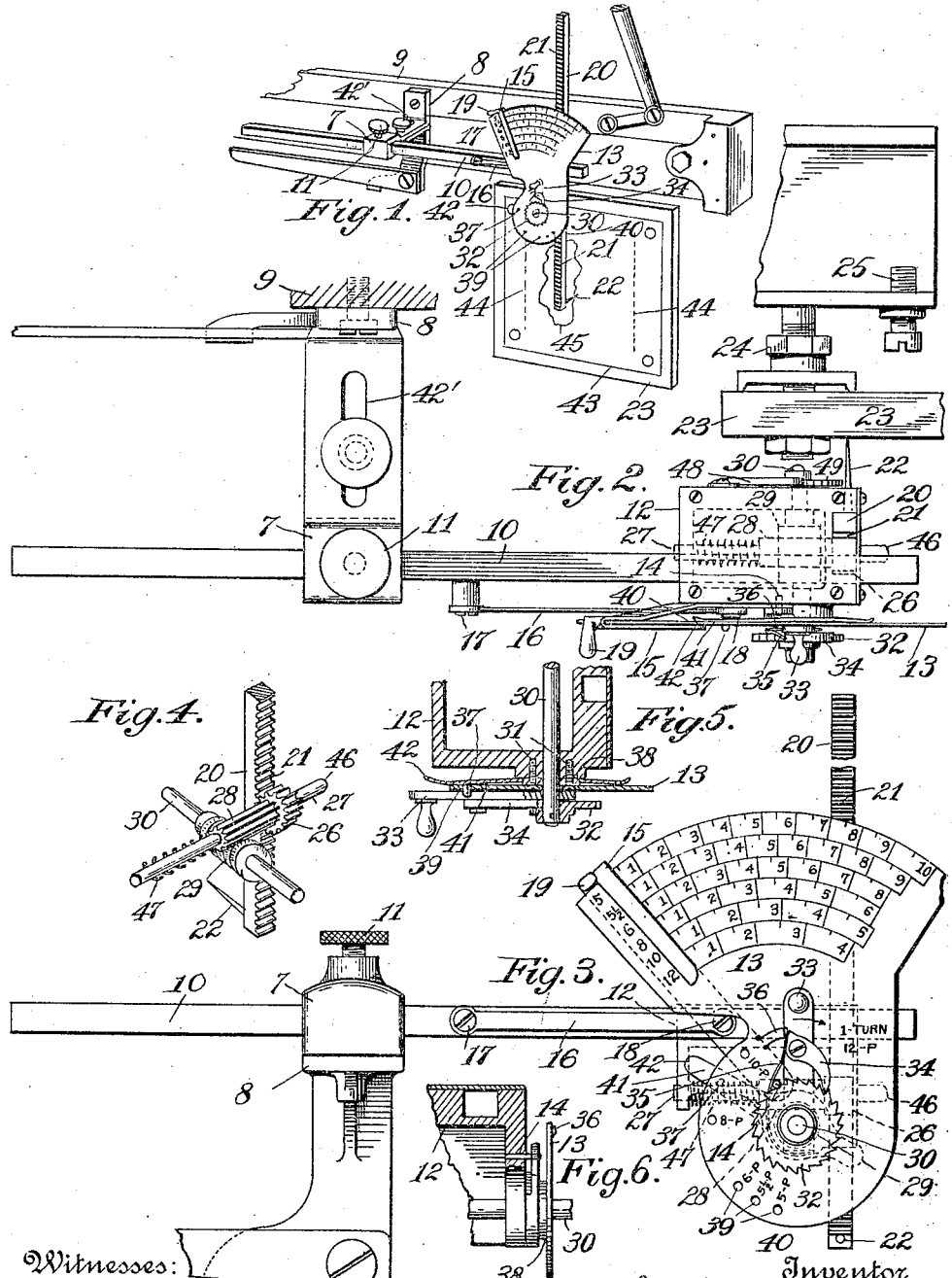

UNITED STATES PATENT OFFICE.

REINHART W. PITTMAN, OF NEW YORK, N. Y., ASSIGNOR TO RICHARD E. WELDON, OF NEW YORK, N. Y.

ATTACHMENT FOR LINOTYPE-MACHINES.

992,385.        Specification of Letters Patent.      Patented May 16, 1911.

Application filed June 7, 1910. Serial No. 565,572.

*To all whom it may concern:*

Be it known that I, REINHART W. PITTMAN, a citizen of the United States, residing in the borough of Manhattan, city, county, and State of New York, have invented certain new and useful Improvements in Attachments for Linotype-Machines, of which the following is a specification.

This invention relates to an improved attachment for linotype machines, and relates particularly to an indicating device to enable the operator to determine the number of quads to fill in the space occupied by a cut having a regular or irregular outline and the number of character matrices to assemble to fill the spaces at either side of such cut, and to enable the operator to readily set up variable lines at either side of the cut so that there will be no waste space around the cut. Furthermore, the operator can readily determine how many spaces are necessary to balance a word or words at the end of a line prior to the setting up of the matrices for said word or words.

It is the object of the present invention to provide a device of this character which is simple in construction and efficient in operation, and which can readily be applied to any linotype machine.

Further objects relate to the scale and pointer for determining the number of quads to be inserted, to the mounting of a copyholder upon the framework of the machine, and to an indicator bar having a pointer lying in close proximity to the said holder, and to means to adjust said indicator bar predetermined variable distances depending upon the character of the matrices being assembled and the height of the linotype slug or bar to be cast.

In the drawings accompanying and forming a part of this specification, Figure 1 is a perspective view of my improved device attached to the assembler arm of a linotype machine. Fig. 2 is an enlarged plan view thereof. Fig. 3 is an enlarged front elevation. Fig. 4 is a perspective view of the means to adjust the indicator bar longitudinally. Fig. 5 is a sectional detail plan view illustrating the manner of mounting the scale, and the crank for longitudinally adjusting the indicator bar predetermined variable distances; and Fig. 6 is a sectional detail view to illustrate the mounting of the pointer and the crank to transversely adjust the indicator bar.

Similar characters of reference designate like parts throughout the different views of the drawings.

My device is adjustably secured in a bracket 7 fixed to a depending portion 8 of the assembler slide 9 of a linotype machine. Adjustably mounted for longitudinal movement in said bracket is an arm or rod 10 and held in its adjusted positions by a set screw 11, said bar having near its outer extremity a block or slide 12 to move with said arm 10 and the assembler slide 9 and to have independent movement along the said rod 10. A scale 13 is fixed to said block, said scale having a series of concentric circles of graduations to indicate different sizes of type, in the present instance shown as six in number, and arranged for from five point to twelve point type. Pivotally secured to said block in back of the scale, as at 14, is a pointer or indicator 15 bent upon itself and over the top of the scale 13 and provided with a finger piece 19. The pointer is connected to the arm 10 by means of a link 16 pivotally secured at 17 to said arm 10, and at 18 to the pointer 15 whereby to impart to the block 12 and scale 13 independent movement along the arm 10 and simultaneously therewith to swing the pointer over the graduations on the scale. Carried by said block 12 to have longitudinal movement therein is a bar 20, in the present instance shown as square in cross section, and having a series of uniformly spaced rack teeth 21, said bar provided near its lower end with a needle or pointer 22 adapted to lie in close proximity to a copy-holder 23 secured to and carried by a clamp 24 fixed to the framework of the linotype machine in any desirable location by a set screw 25. A pinion 26 fixed to a shaft 27 is mounted for rotary and endwise movement in the block 12 and normally meshes with the teeth 21 on the bar 20. A second pinion 28 fixed to said shaft 27 meshes with a multiple threaded worm 29 on a shaft 30 rotatively mounted in the block 12 with its axis transverse to the axis of the shaft 27. The shaft 30 extends through the front wall of the block 12 beyond the scale 13 and has fixed thereto in front of the scale a ratchet 32. Loosely mounted on said shaft between the scale and ratchet 32 is a crank or lever 33 having a pawl 34 pivotally secured thereto and normally maintained in mesh with the ratchet 32 by a spring 35. In its normal position the crank 33 abuts against a spring stop 36, which stop limits its movement in one direction. Movement or motion in the opposite direction is limited by an adjustable stop 37, said stop in the form of a pin carried by a spring detent 41 provided with a finger-piece 42 and loosely mounted for rotary movement on a boss 38 on the block 12, and adapted to engage in any one of a series of perforations or apertures 39 circumferentially disposed in a circular portion 40 at the lower end of the scale 13. The portion 40 of the plate or scale may be provided with characters opposite each perforation to indicate the distance the bar 20 will be adjusted which will be the height of a certain type according to the size of type on the bars to be cast.

The ratio between the teeth on the bar 20, the pinions 26, 28 and the worm 29 is such that to one complete revolution of the crank 33 the indicator bar 20 will descend or be lowered a distance the height of a twelve point type or one-sixth of an inch. Should the stop 41 be adjusted so that it will engage in the perforation marked "6-P," when the crank 33 comes in contact therewith the bar 20 will have been adjusted a distance equal the height of a six point type.

The pointer 22 may be adjusted relatively to the copy-holder so that it will lie close thereto by loosening the set screw 11 which engages in a slot 42' in the bracket 7 and moving the device either forwardly or backwardly as may be desired and then again tightening the set screw to secure it in place.

The operation of my device is as follows: A piece of paper 43 (Fig. 1) having two vertical lines 44, 44 thereon spaced apart a distance equal to the width of a column, and having a negative impression or outline 45 of the cut thereon about which it is desired to set up intelligible characters, or reading matter, this outline being placed upon the paper in the position it is to occupy in the printed copy, is attached to the copy-holder in any desirable manner. The bar 10 is now adjusted so that the pointer 22 carried by the bar 20 will register with the margin line 44 at the right on the paper 43 and the arm 10 secured in such position by the set screw 11. By pressing upon the projecting end 46 of the shaft 27 mounted in the block 12, said shaft will slide endwise and with it the pinion 26, against the tension of a spring 47 coiled about the shaft 27 and engaging between the end of the pinion 28 and the inner wall of the block 12, thereby throwing said pinion 26 out of mesh with the rack teeth 21 on said bar 20. The bar 20 is then adjusted by hand so that the pointer 22 will register substantially with the upper edge of the outline of the cut on the sheet 43. Pressure is now released upon the end of the shaft 27 and the pinion 26 is caused to again come in mesh with the rack teeth 21 by the spring 47, and the bar locked in such position by a spring pressed pawl 48 engaging with a ratchet wheel 49 fixed to the shaft 30 at the back of the block 12. It will be noted that the pinion 28 is of such length that it will always be in mesh with the worm 29 during the shifting movement of the shaft 27. The linotype machine is now operated until the pointer 22 comes to a point near the right hand edge of the outline of the cut 45 up to where it is desired to have the printed matter come. The operator then swings the pointer or indicator 15 by means of the finger-piece 19 around the dial or scale 13 and therewith slides the block 12 along the arm 10 until the pointer 22 comes to a point adjacent to the left hand edge of the outline of the cut and up to where it is desired to have the printed matter come. The motion of the portion of the pointer 15 bent over the dial or scale 13 will indicate on said scale the number of quads to be inserted to fill the space occupied by the cut. Assuming that matrices for six point type are being assembled and the pointer is swung along the scale until it registers with the number "5" in the line of graduations marked "6" it will indicate that five quads are to be filled in. After the operator has inserted the number of quads indicated by the pointer the said pointer is returned to its normal position and the operator continues setting up the matrices until the end of the line is reached, when the device is carried back to begin a new line by the assembler slide of the linotype machine.

Assuming, as hereinbefore stated, that matrices for type-bars having six point type are being set up, the adjustable stop is adjusted until the stop pin thereof engages in the perforation marked "6-P" in the circular portion 40 of the dial 13. After a line of matrices has been set up the crank 33 is rotated to the right in the direction of the arrow until it abuts against the stop pin 37, the pawl 34 engaging with the ratchet 32 imparting rotary motion through the worm 29 to the pinion 28 meshing therewith and the pinion 26 meshing with the rack teeth 21 on the indicator bar 20, causing said bar to move down a distance equal to the height of a six point type, when the crank is returned to normal position and the operation of setting up another line of matrices is repeated, the engagement of the pawl 48 with the ratchet 49 locking the shaft 30 against rotation when the crank is returned to normal position and also locking the bar 20 in its advanced position. Should the cut have a regular or rectangular outline and the side edges come along the line of intersection of two columns, or should it have one edge terminating in one column and reading matter between the other edge and the other column, a negative impression or outline of the cut is placed on the paper on the copy-holder and the matrices are set up to the edge of the outline of the cut, or from the outline of the cut to the column line, in accordance with whether the type matrices are being assembled at one or the other side of the outline of the cut. In this case the indicator bar 20 is also adjusted after each line of matrices has been assembled. If the major portion of the line is to be quads, the operator may start with the slide at the right hand outline of the cut and set up quads until the pointer 22 registers with the left-hand edge of the outline of the cut. The pointer or indicator 15 is then swung about the dial 13 until the pointer 22 registers with the left-hand column line 44 the said pointer 15 indicating on the dial or scale 13 how many type matrices are to be inserted to fill in the line.

Variations may be resorted to within the scope of the invention.

Having thus described my invention, I claim:

1. In a device of the class specified, the combination with the assembling mechanism of a linotype machine and a fixed copy-holder, of an arm adjustably secured to said assembling mechanism and movable therewith, a block mounted on said arm to move therewith and have movement along the same independent of the assembling mechanism, a dial or scale having a series of graduations thereon and connected to said block, an indicator or pointer pivotally secured to the block back of the dial and bent upon itself and over the top of the dial and provided with a finger-piece, said indicator also having a pivoted link connected with the arm and operable to impart independent movement to said block along the arm and simultaneously therewith indicate on the dial the extent of such movement, a bar carried by said block adjustable transversely to the movement of said block, said bar having a pointer lying adjacent to the copy-holder, a crank to adjust said bar predetermined variable distances in one direction transverse to the movement of the block, a stop with which said crank normally engages, and means to adjust said device on the assembling mechanism toward and away from the copy holder.

2. In a device of the class specified, the combination with the assembling mechanism of a linotype machine and a fixed copy-holder, of an arm adjustably secured to said assembling mechanism and movable therewith, a block mounted on said arm to move therewith and have movement along the same independent of the assembling mechanism, a dial or scale having a series of graduations thereon and connected to said block, an indicator or pointer pivotally secured to the block in back of the dial and bent upon itself and over the top of the dial and also connected to the arm, said indicator operable to impart independent movement to said block along the arm and indicate on the dial the extent of such movement, a bar carried by said block and adjustable transversely to the movement of said block, a crank to adjust said bar transversely to the movement of the block, a stop with which said crank normally engages, and an adjustable stop with which said crank engages to limit the transverse adjustment of the bar.

3. In a device of the class specified, the combination with the assembling mechanism of a linotype machine and a fixed copy-holder, of an arm adjustably secured to said assembling mechanism and movable therewith, a block mounted on said arm to move therewith and have movement along the same independent of the assembling mechanism, a dial or scale having a series of graduations thereon and connected to said block, an indicator or pointer pivotally connected to the arm and to the block and operable to impart independent movement to said block along the arm and indicate on the dial the extent of said movement, a bar carried by said block and adjustable transversely to the movement of said block, a crank to adjust said bar transversely to the movement of the block, a stop with which said crank normally engages, and an adjustable stop with which said crank engages to limit the transverse movement of the bar; said adjustable stop comprising a pin fixed to a spring detent having a finger-piece and rotatively mounted on the block, and said pin adapted to engage with either one of a series of perforations in the dial.

4. In a device of the class specified, the combination with the assembling mechanism of a linotype machine and a copy-holder fixed thereto, of an arm adjustably secured to said assembling mechanism and movable therewith, a block mounted on said arm to move therewith, and have along the same independent of the assembling mechanism, a dial or scale having a series of graduations thereon and connected to said block, an indicator or pointer pivotally secured to the arm and to the block and operable to impart independent movement to said block along the arm and indicate on the dial the extent of such movement, a bar carried by said block and adjustable transversely to the movement of said block, said bar being square in cross-section and having rack teeth on one face thereof; and means to adjust said bar variable distances transversely to the movement of the block, comprising a shaft rotatively mounted in the block, a ratchet fixed to said shaft, a crank rotatably mounted on said shaft, a spring pressed pawl carried by said crank and engaging with said ratchet, a multiple threaded worm on said shaft, a second shaft the axis of which is transverse to the axis of the first shaft and mounted in the block for rotary and longitudinal movement, a pinion thereon to mesh with the worm, and a second pinion on said shaft to mesh with the rack teeth on the bar.

5. In a device of the class specified, the combination with the assembling mechanism of a linotype machine and a copy-holder fixed thereto, of an arm adjustably secured to said assembling mechanism and movable therewith a block mounted on said arm to move therewith and have movement along the same independent of the assembling mechanism, a dial or scale having a series of graduations thereon and connected to the block, an indicator or pointer pivotally secured to the arm and to the block and operable to impart independent movement to said block along the arm and indicate on the dial the extent of such movement, a bar carried by said block and adjustable transversely to the movement of said block, said bar being square in cross section and having rack teeth on one face thereof; means to adjust said bar transversely to the movement of the block, comprising a shaft rotatively mounted in the block, a ratchet fixed to said shaft, a crank rotatively mounted on said shaft, a spring pressed pawl carried by said crank and engaging with said ratchet, a multiple threaded worm on said shaft, a second shaft the axis of which is transverse to the axis of the first shaft and mounted in the block for rotary and longitudinal movement, a pinion to mesh with the worm, and a second pinion on said shaft to mesh with the rack teeth on the bar; and a spring coiled about the latter shaft the tension thereof maintaining the second pinion in mesh with the rack; said rack being adjustable to its normal position by sliding the second pinion with its shaft out of mesh with the rack teeth and against the tension of the spring.

6. In a device of the class specified, the combination with the assembling mechanism of a linotype machine and a fixed copy-holder, of an arm adjustably secured to said assembling mechanism and movable therewith, a block mounted on said arm to move therewith and have movement along the same independent of the assembling mechanism, a dial or scale having a series of graduations thereon and connected to the block, an indicator or pointer pivotally secured to the block back of the dial and bent upon itself and over the top of the dial and provided with a finger-piece, said indicator also having a pivoted link connection with the arm and operable to impart independent movement to said block along the arm and simultaneously therewith indicate on the dial the extent of such movement, a bar carried by said block adjustable transversely to the movement of said block, said bar having a pointer lying adjacent to the copy-holder and being square in cross-section with rack teeth on one face thereof; means to adjust said bar variable distances transversely to the movement of the block, comprising a shaft rotatively mounted in the block, a ratchet fixed to said shaft, a crank rotatively mounted on said shaft, a spring pressed pawl carried by said crank and engaging with said ratchet, a multiple threaded worm on said shaft, a second shaft the axis of which is transverse to the axis of the first shaft and mounted in the block for rotary and longitudinal sliding movement, a pinion thereon to mesh with the worm, and a second pinion on said shaft to mesh with the rack teeth on the bar; a second ratchet on the first-mentioned shaft and a pawl pivoted on the block to engage with said pawl to maintain the rack in adjusted position and prevent the rotation of the shaft when the crank is returned to normal position; a coiled spring on the second shaft the tension thereof maintaining the second pinion in mesh with the rack; said rack being adjustable to its normal position by sliding the second pinion and its shaft out of mesh with the rack teeth and against the tension of the spring; a stop with which the crank normally engages; and an adjustable stop with which said crank engages to limit the transverse movement of the bar, said adjustable stop comprising a pin fixed to a spring detent having a finger-piece and rotatively mounted on the block, and said pin adapted to engage with either one of a series of perforations in the dial.

REINHART W. PITTMAN.

Witnesses:
  Chas. Bott,
  J. Close.